United States Patent
Xu et al.

(10) Patent No.: US 10,793,759 B2
(45) Date of Patent: Oct. 6, 2020

(54) SULFUR- AND PHOSPHORUS-FREE EXTREME PRESSURE LUBRICANT AND PREPARATION METHOD AND APPLICATION THEREOF

(71) Applicants: YANGTZE UNIVERSITY, Jingzhou (CN); Jingzhou Jiahua Technology Co., Ltd., Jingzhou (CN)

(72) Inventors: Mingbiao Xu, Jingzhou (CN); Fuchang You, Jingzhou (CN); Shanshan Hou, Jingzhou (CN); Jiao Wu, Jingzhou (CN)

(73) Assignees: YANGTZE UNIVERSITY, Jingzhou (CN); Jingzhou Jiahua Technology Co., Ltd., Jingzhou (CN)

( * ) Notice: Subject to any disclaimer, the term of this patent is extended or adjusted under 35 U.S.C. 154(b) by 0 days.

(21) Appl. No.: 16/684,716

(22) Filed: Nov. 15, 2019

(65) Prior Publication Data
US 2020/0157400 A1 May 21, 2020

(30) Foreign Application Priority Data
Nov. 15, 2018 (CN) .......................... 2018 1 1359549

(51) Int. Cl.
| | | |
|---|---|---|
| *C09K 8/035* | (2006.01) | |
| *C10M 105/72* | (2006.01) | |
| *C10M 161/00* | (2006.01) | |
| *C10M 177/00* | (2006.01) | |
| C10N 40/00 | (2006.01) | |
| C10N 30/06 | (2006.01) | |
| C10N 50/08 | (2006.01) | |

(52) U.S. Cl.
CPC ........... *C09K 8/035* (2013.01); *C10M 105/72* (2013.01); *C10M 161/00* (2013.01); *C10M 177/00* (2013.01); C09K 2208/10 (2013.01); C09K 2208/34 (2013.01); C10M 2207/00 (2013.01); C10M 2207/02 (2013.01); C10M 2213/062 (2013.01); C10M 2215/26 (2013.01); C10M 2219/042 (2013.01); C10N 2030/06 (2013.01); C10N 2040/40 (2020.05); C10N 2050/08 (2013.01)

(58) Field of Classification Search
CPC ................ C09K 8/035; C09K 2208/10; C09K 2208/34; C10M 105/72; C10M 161/00; C10M 177/00; C10M 2207/00; C10M 2207/02; C10M 2213/062; C10M 2215/26; C10M 2219/042; C10M 2207/021; C10M 173/00; C10M 2203/10; C10M 2201/02; C10M 2207/123; C10M 2215/042; C10M 2207/142; C10N 2040/40; C10N 2030/06; C10N 2050/08; C10N 2030/02; C10N 2020/06; C10N 2030/42; C10N 2030/43
See application file for complete search history.

(56) References Cited

U.S. PATENT DOCUMENTS

| | | | | |
|---|---|---|---|---|
| 3,761,410 A | * | 9/1973 | Mondshine | C09K 8/22 507/134 |
| 5,846,447 A | * | 12/1998 | Beatty | C08J 3/09 510/181 |

FOREIGN PATENT DOCUMENTS

| | | | |
|---|---|---|---|
| CN | 102453589 B | | 10/2013 |
| CN | 103805312 A | | 5/2014 |
| CN | 104844656 A | | 8/2015 |
| CN | 105236801 | * | 1/2016 |
| CN | 103319539 B | | 6/2016 |
| CN | 106701255 | * | 5/2017 |
| CN | 105238539 B | | 3/2018 |
| CN | 108300544 | * | 7/2018 |

* cited by examiner

*Primary Examiner* — Kumar R Bhushan
(74) *Attorney, Agent, or Firm* — Troutman Pepper Hamilton Sanders LLP; Christopher C. Close, Jr.

(57) ABSTRACT

A sulfur- and phosphorus-free extreme pressure lubricant and a preparation method thereof is disclosed. The lubricant is prepared by using Turkey red oil, a cyclic anhydride compound, triethanolamine, nano polytetrafluoroethylene powder, an alcohol compound, and water as raw materials. The lubricant does not contain hazardous substances such as sulfur and phosphorus. This reduces the harm to the environment, equipment, and human body, and conforms to the development trend of modern industrial production. Moreover, the lubricant has excellent extreme pressure performance, and can effectively reduce the downhole friction and torque, thereby meeting the construction requirements of extended reach wells and horizontal wells.

19 Claims, No Drawings

SULFUR- AND PHOSPHORUS-FREE EXTREME PRESSURE LUBRICANT AND PREPARATION METHOD AND APPLICATION THEREOF

TECHNICAL FIELD

The present invention belongs to the field of lubricant technologies, and specifically, to a sulfur- and phosphorus-free extreme pressure lubricant and a preparation method and use thereof.

BACKGROUND

With the development of petroleum exploration and development technologies, extended reach well and horizontal well technologies are widely used. The high friction and torque produced during drilling will damage drilling equipment, thereby affecting the exploration and development of petroleum. Therefore, it is urgent to develop a high-efficiency lubricant that can effectively reduce the friction and torque in a well. A sulfide lubricant usually has better extreme pressure performance than other types of extreme pressure agents. Therefore, it has become a widely used extreme pressure lubricant product. However, a sulfide in this type of lubricant has a strong smell and is irritating to the skin. Moreover, the sulfide is easily hydrolyzed in water to cause corrosion, and will seriously pollute the environment after being decomposed, which cannot meet the industrial requirements of modern green production.

Existing technologies, such as Chinese patents numbered CN105238539A, CN102453589A, CN103805312A, CN103319539A, and CN104844656A, have disclosed several sulfur-free lubricants. However, most of these lubricants are used in the field of industrial and automotive oil, to reduce the content of pollutants in tail gas, but they cannot be directly used in drilling fluid.

SUMMARY

An objective of the present invention is to provide a sulfur- and phosphorus-free extreme pressure lubricant and a preparation method thereof. The lubricant provided by the present invention is environmentally friendly and has excellent extreme pressure performance, and can be used in drilling fluid.

To achieve the above objective, the present invention provides the following technical solutions:

The present invention provides a sulfur- and phosphorus-free extreme pressure lubricant, including the following raw materials: 20-30 parts by weight of Turkey red oil, 20-30 parts by weight of cyclic anhydride compound, 15-20 parts by weight of triethanolamine, 10-20 parts by weight of nano polytetrafluoroethylene powder, 5-10 parts by weight of alcohol compound, and water.

Preferably, the cyclic anhydride compound includes one or two of tetrahydrophthalic anhydride, hexahydrophthalic anhydride, and cis-1,2,3,6-tetrahydrophthalic anhydride.

Preferably, a particle size of the nano polytetrafluoroethylene powder is 50-300 nm.

Preferably, the alcohol compound includes ethanol or isopropanol.

The present invention provides a preparation method of the sulfur- and phosphorus-free extreme pressure lubricant according to the technical solution, where the preparation method includes the following steps: mixing the cyclic anhydride compound, triethanolamine, and water, and conducting first-stage reaction; mixing a product of the first-stage reaction with the Turkey red oil, and conducting second-stage reaction; mixing a product of the second-stage reaction with the nano polytetrafluoroethylene powder and alcohol compound, and conducting third-stage reaction to obtain the sulfur- and phosphorus-free extreme pressure lubricant.

Preferably, the temperature of the first-stage reaction is 80-90° C., and the time is 3-4 h.

Preferably, the temperature of the second-stage reaction is 160-180° C., and the time is 1-2 h.

Preferably, the temperature of the third-stage reaction is 160-180° C., and the time is 40-60 min.

The present invention provides use, in drilling fluid, of the sulfur- and phosphorus-free extreme pressure lubricant described in the foregoing technical solution or the sulfur- and phosphorus-free extreme pressure lubricant prepared by the preparation method described in the foregoing technical solution.

Preferably, a dosage ratio of the sulfur- and phosphorus-free extreme pressure lubricant to the drilling fluid is 0.5-3 g/100 mL.

The present invention provides a sulfur- and phosphorus-free extreme pressure lubricant, including the following raw materials: 20-30 parts by weight of Turkey red oil, 20-30 parts by weight of cyclic anhydride compound, 15-20 parts by weight of triethanolamine, 10-20 parts by weight of nano polytetrafluoroethylene powder, 5-10 parts by weight of alcohol compound, and water. In the present invention, the cyclic anhydride compound reacts with triethanolamine and Turkey red oil to obtain a main compound of the lubricant, so as to improve the extreme pressure performance and lubricating performance of the lubricant; an alcohol hydroxyl group contained in the alcohol compound can improve the hydrophilicity and adsorbability of the main compound of the lubricant and the nano polytetrafluoroethylene powder, so that the main component of the lubricant is adsorbed on the surface of drilling equipment, reducing the damage to the equipment. Results of the embodiments show that after the lubricant provided by the present invention is added to bentonite slurry and a PLUS-KCl system, and when a dosage of the lubricant is 4.0 g/400 mL, the following extreme pressure performance can be achieved: A lubrication coefficient reduction rate of the bentonite slurry can reach above 97%, and a lubrication coefficient reduction rate of the drilling fluid system can reach above 75%.

DETAILED DESCRIPTION

The present invention provides a sulfur- and phosphorus-free extreme pressure lubricant, including the following raw materials: 20-30 parts by weight of Turkey red oil, 20-30 parts by weight of cyclic anhydride compound, 15-20 parts by weight of triethanolamine, 10-20 parts by weight of nano polytetrafluoroethylene powder, 5-10 parts by weight of alcohol compound, and water.

The raw materials for preparing the sulfur- and phosphorus-free extreme pressure lubricant provided by the present invention includes 20-30 parts by weight of Turkey red oil, preferably includes 22-28 parts by weight of the Turkey red oil, and more preferably includes 24-27 parts by weight of the Turkey red oil.

Based on the parts by weight of the Turkey red oil, the raw materials for preparing the sulfur- and phosphorus-free extreme pressure lubricant provided by the present invention includes 20-30 parts of cyclic anhydride compound, preferably includes 23-28 parts of the cyclic anhydride compound, and more preferably includes 24-27 parts of the cyclic anhydride compound. In the present invention, the cyclic anhydride compound preferably includes one or two of tetrahydrophthalic anhydride, hexahydrophthalic anhydride, and cis-1,2,3,6-tetrahydrophthalic anhydride. In this embodiment of the present invention, the cyclic anhydride compound preferably includes cis-1,2,3,6-tetrahydrophthalic anhydride, tetrahydrophthalic anhydride, or a mixture of hexahydrophthalic anhydride and tetrahydrophthalic anhydride and hexahydrophthalic anhydride. In the present invention, when the cyclic anhydride compound is a mixture of several components, the components in the mixture preferably have the same mass.

Based on the parts by weight of the Turkey red oil, the raw materials for preparing the sulfur- and phosphorus-free extreme pressure lubricant provided by the present invention includes 15-20 parts of triethanolamine, preferably includes 16-20 parts of the triethanolamine, and more preferably includes 20 parts of the triethanolamine.

Based on the parts by weight of the Turkey red oil, the raw materials for preparing the sulfur- and phosphorus-free extreme pressure lubricant provided by the present invention includes 10-20 parts of nano polytetrafluoroethylene powder, preferably includes 12-20 parts of the nano polytetrafluoroethylene powder, and more preferably includes 14-20 parts of the nano polytetrafluoroethylene powder. In the present invention, a particle size of the nano polytetrafluoroethylene powder is preferably 50-300 nm, more preferably 100-275 nm, and further preferably 150-230 nm.

Based on the parts by weight of the Turkey red oil, the raw materials for preparing the sulfur- and phosphorus-free extreme pressure lubricant provided by the present invention includes 5-10 parts of alcohol compound, preferably includes 6-10 parts of the alcohol compound, and more preferably includes 7-10 parts of the alcohol compound. In the present invention, the alcohol compound preferably includes ethanol or isopropanol.

The raw materials for preparing the sulfur- and phosphorus-free extreme pressure lubricant provided by the present invention further includes water that is preferably deionized water. There is no special requirement for a dosage of water in the present invention, as long as a dosage well known to those skilled in the art is adopted. In this embodiment of the present invention, the dosage of water is preferably 80-120 parts, and more preferably 85-100 parts.

In the present invention, the lubricant is prepared by using the Turkey red oil, cyclic anhydride compound, triethanolamine, nano polytetrafluoroethylene powder, alcohol compound, and water as raw materials. The obtained lubricant does not contain sulfur and phosphorus components, thereby reducing the harm to the environment and human body, and is more environmentally friendly. In the raw materials for preparing the lubricant provided by the present invention, the cyclic anhydride compound reacts with the triethanolamine and Turkey red oil to obtain a main compound of the lubricant, to improve the extreme pressure performance and lubricating performance of the lubricant; the alcohol hydroxyl group contained in the alcohol compound can improve the hydrophilicity and adsorbability of the main compound of the lubricant and the nano polytetrafluoroethylene powder, making the main compound of the lubricant firmly adsorbed on the surface of drilling equipment, thereby reducing the downhole friction and torque.

In the above embodiment, the raw materials for preparing the sulfur- and phosphorus-free extreme pressure lubricant in the present invention are all commercially available products known to those skilled in the art.

The present invention further provides a preparation method of the sulfur- and phosphorus-free extreme pressure lubricant according to the foregoing technical solution. The preparation method includes the following steps:

mixing the cyclic anhydride compound, triethanolamine, and water, and conducting first-stage reaction; mixing a product of the first-stage reaction with the Turkey red oil, and conducting second-stage reaction; mixing a product of the second-stage reaction with the nano polytetrafluoroethylene powder and alcohol compound, and conducting third-stage reaction to obtain the sulfur- and phosphorus-free extreme pressure lubricant.

In the present invention, the cyclic anhydride compound, triethanolamine and water are mixed, and the first-stage reaction is conducted. In the present invention, the temperature of the first-stage reaction is preferably 80-90° C., more preferably 82-90° C., and further preferably 85-90° C.; and the time of the first-stage reaction is preferably 3-4 h, more preferably 3-3.5 h, and further preferably 3 h. The first-stage reaction in the present invention includes a hydrolysis reaction of the cyclic anhydride compound. Then, an esterification reaction between a product of the hydrolysis reaction and triethanolamine is conducted, to produce an organic compound containing diester bonds.

After the first-stage reaction, in the present invention, the product of the first-stage reaction is mixed with the Turkey red oil, and the second-stage reaction is conducted. In the present invention, the temperature of the second-stage reaction is preferably 160-180° C., more preferably 165-180° C., and further preferably 170-180° C.; and the time of the second-stage reaction is preferably 1-2 h, and more preferably 1.5 h. In the present invention, the second-stage reaction is a substitution reaction between the Turkey red oil and the product of the first-stage reaction, and the product of the reaction is a main compound of the sulfur- and phosphorus-free extreme pressure lubricant.

After the second-stage reaction, in the present invention, the product of the second-stage reaction is mixed with the nano polytetrafluoroethylene powder and alcohol compound, and the third-stage reaction is conducted to obtain the sulfur- and phosphorus-free extreme pressure lubricant. Before mixing the product of the second-stage reaction with the nano polytetrafluoroethylene powder and alcohol compound, in the present invention, the product of the second-stage reaction is preferably cooled to ensure that the mixing operation is safely conducted. In the present invention, the final temperature after the cooling is preferably 80-90° C., more preferably 82-90° C., and further preferably 85-90° C. A cooling method well known to those skilled in the art can be used. In the present invention, the mixing operation is preferably conducted in a blending kettle.

In the present invention, after mixing is conducted, the mixed system is preferably heated for conducting the third-stage reaction. In the present invention, the temperature of the third-stage reaction is preferably 160-180° C., more preferably 165-180° C., and further preferably 170-180° C.; and the time of the third-stage reaction is preferably 40-60 min, more preferably 40-55 min, and further preferably 40-50 min. In the present invention, the third-stage reaction includes a substitution reaction and an addition reaction. The substitution reaction can introduce an alcohol hydroxyl group, and the addition reaction can introduce a polytetrafluoroethylene group. A product obtained after the substitution reaction and addition reaction is a sulfur- and phosphorus-free extreme pressure lubricant. In order to better introduce the nano polytetrafluoroethylene powder into the reaction system, in the present invention, the third-stage reaction is preferably conducted in a vacuum condition that means negative pressure of 0.2 MPa. There is no special requirement for an implementation mode of the vacuum condition in the present invention, as long as a vacuum condition well known to those skilled in the art can be used.

The present invention further provides use, in drilling fluid, of the sulfur- and phosphorus-free extreme pressure lubricant described in the forgoing technical solution or the sulfur- and phosphorus-free extreme pressure lubricant prepared by the preparation method described in the forgoing technical solution.

In the present invention, a use manner preferably includes mixing the sulfur- and phosphorus-free extreme pressure lubricant with the drilling fluid. There is no special requirement for components of the drilling fluid in the present invention, as long as components of drilling fluid that are well known to those skilled in the art are used. In the present invention, a ratio of the mass of the sulfur- and phosphorus-free extreme pressure lubricant to a volume of the drilling fluid is preferably 0.5-3 g/100 mL, more preferably 0.7-2.5 g/100 mL, and further preferably 1.0-2.0 g/100 mL.

To further describe the present invention, the sulfur- and phosphorus-free extreme pressure lubricant and the preparation method and use thereof that are provided by the present invention will be described in detail with reference to embodiments, but this cannot be understood as a limitation on the protection scope of the present invention.

In the following embodiments and comparative examples, the number of parts mentioned is based on weight parts.

Embodiment 1

30 parts of cyclic anhydride compound (tetrahydrophthalic anhydride), 15 parts of triethanolamine, and 80 parts of water were successively added to a reactor, stirred, and heated to 90° C. for reaction for 3 h; 25 parts of Turkey red oil was added to the reactor, and the obtained mixture was further heated to 180° C. for reaction for 1.5 h, cooled to 90° C., and then transferred to a blending kettle; 20 parts of nano polytetrafluoroethylene powder (300 nm) and 10 parts of ethanol that were uniformly mixed were added to the blending kettle, the obtained mixture was subject to reaction at 180° C. under negative pressure of 0.2 MPa for 40 min, then subject to circulating filtration, and cooled to room temperature to obtain brown liquid, that is, a high-efficiency sulfur- and phosphorus-free extreme pressure lubricant.

Embodiment 2

25 parts of anhydride compound (hexahydrophthalic anhydride and cis-1,2,3,6-tetrahydrophthalic anhydride at a mass ratio of 1:1), 20 parts of triethanolamine, and 120 parts of water were successively added to a reactor, stirred, and heated to 90° C. for reaction for 3 h; 30 parts of Turkey red oil was added to the reactor, and the obtained mixture was further heated to 180° C. for reaction for 2 h, cooled to 90° C., and then transferred to a blending kettle; 20 parts of nano polytetrafluoroethylene powder (200 nm) and 5 parts of isopropanol that were uniformly mixed were added to the blending kettle, the obtained mixture was subject to reaction at 180° C. under negative pressure of 0.2 MPa for 40 min, then subject to circulating filtration, and cooled to room temperature to obtain brown liquid, that is, a high-efficiency sulfur- and phosphorus-free extreme pressure lubricant.

Embodiment 3

20 parts of cyclic anhydride compound (cis-1,2,3,6-tetrahydrophthalic anhydride), 20 parts of triethanolamine, and 100 parts of water were successively added to a reactor, stirred, and heated to 90° C. for reaction for 3 h; 30 parts of Turkey red oil was added to the reactor, and the obtained mixture was further heated 180° C. for reaction for 1.5 h, cooled to 90° C., and then transferred to a blending kettle; 20 parts of nano polytetrafluoroethylene powder (50 nm) and 10 parts of ethanol that were uniformly mixed were added to the blending kettle, the obtained mixture was subject to reaction at 180° C. under negative pressure of 0.2 MPa for 40 min, then subject to circulating filtration, and cooled to room temperature to obtain brown liquid, that is, a high-efficiency sulfur- and phosphorus-free extreme pressure lubricant.

Blank Test Example

In the performance test of bentonite slurry and a PLUS-KCL system, no lubricant was added.

Comparative Example 1

A polyol JLX-B of China Oilfield Services Limited was used as a lubricant.

Application Performance Test and Results

1. Performance Comparison of Bentonite Slurry

According to a method specified in the Q/SY 1088-2012 standard, the lubricating performance of the lubricants in Embodiments 1 to 3 and Comparative Example 1 was tested. The lubricating performance was characterized by a lubrication coefficient reduction rate; and the anti-wear performance of the lubricants was tested with a KMY201-1A anti-wear tester.

The present invention adopts the following bentonite slurry formula, specifically including the following steps:

Five groups of base slurry were prepared; and 400 mL of distilled water, 0.8 g of anhydrous sodium carbonate, and 20 g of dry sodium bentonite were added to each group of base slurry, stirred by a high-speed stirrer at a rotating speed of 3000 r/min for 20 min, and then maintained in a closed condition at room temperature for 24 h.

Test samples (a dosage of each test sample is 4.0 g) in Embodiments 1 to 3 were respectively added to three groups of base slurry, and 4.0 g of the lubricant in Comparative Example 1 was added to one group of base slurry. Another group of base slurry without any lubricant was used as a blank test sample. The foregoing test samples were respectively stirred for 10 min at a rotating speed of 3000 r/min, aged at 180° C. for 16 h, and cooled to room temperature. An extreme-pressure lubrication coefficient reduction rate (Rx) of each sample was tested. The anti-wear performance of the five test samples was evaluated with the KMY201-1A anti-wear tester. For test results, refer to Table 1.

The lubrication coefficient reduction rate ($R_K$) was calculated according to the following formula (1):

$$R_K = \frac{K_0 - K_1}{K_0} \times 100\% \quad (1)$$

where $R_k$ is the lubrication coefficient reduction rate, %;
$K_0$ is a lubrication coefficient of the blank test example; and
$K_1$ is a lubrication coefficient of the blank test example to which a lubricant is added.

TABLE 1

Performance comparison of lubricants in bentonite slurry

| Test sample | Lubrication coefficient reduction rate (%) | Anti-wear weight (block) |
| --- | --- | --- |
| Blank Test Example | / | 3 |
| Embodiment 1 | 98.76 | 10. |
| Embodiment 2 | 97.64 | 10. |
| Embodiment 3 | 98.85 | 10 |
| Comparative Example 1 | 72.51 | 7 |

It can be seen from the test results in Table 1 that, compared with the test examples in the Blank Test Example and Comparative Example 1, the sulfur- and phosphorus-free extreme pressure lubricant provided by the present invention can improve the lubricating performance and anti-wear performance of the bentonite slurry. In this way, the lubrication coefficient reduction rate of the bentonite slurry system can reach above 97%, and the number of anti-wear weights (800 g/block) can reach 10.

2. Performance Comparison in a PLUS-KCl System

The present invention adopts the following drilling fluid system formula to evaluate the lubricants in Embodiments 1 to 3 and Comparative Example 1, including the following steps:

Five groups of base slurry were prepared; and 400 g of South China Sea water, 8 g of bentonite slurry, 0.6 g of sodium carbonate, 0.8 g of sodium hydroxide, 0.8 g of polyacrylamide, 0.8 g of polyanionic cellulose, 0.6 g of biopolymer, 4 g of lubricant, 8 g of asphalt resin, 10 g of anti-sloughing fluid loss agent, 4 g of film-forming agent, and 20 g of potassium chloride were added to each group of base slurry. No lubricant was added to one of the groups of base slurry; the lubricants (an addition amount of each lubricant is 4.0 g) prepared in Embodiments 1-3 were respectively added to three groups of base slurry; and 4.0 g of the lubricant in Comparative Example 1 was added to another group of base slurry. Then, these test samples were aged at 180° C. for 16 h. Rheological properties of these test samples were tested at 65° C., and extreme-pressure lubrication coefficient reduction rates and the anti-wear performance of the system were tested at room temperature. For experimental results, refer to Table 3.

TABLE 3

Performance comparison of lubricants in a water-based drilling fluid system

| Drilling fluid | AV (mPa·s) | PV (mPa·s) | YP (Pa) | Φ3 | $FL_{API}$ (mL) | ρ (g/cm³) | Lubrication coefficient reduction rate (%) | Anti-wear weight (800 g/block) |
| --- | --- | --- | --- | --- | --- | --- | --- | --- |
| Blank Test Example | 29 | 24 | 5 | 6 | 5.0 | 1.05 | / | 4 |
| Embodiment 1 | 30 | 24 | 6 | 6 | 4.7 | 1.15 | 75.24 | 9 |
| Embodiment 2 | 30 | 23 | 7 | 6 | 4.5 | 1.15 | 77.62 | 8 |
| Embodiment 3 | 31 | 24 | 7 | 7 | 4.2 | 1.15 | 79.22 | 10 |
| Comparative Example 1 | 30" | 24 | 6 | 7 | 5.0 | 1.07 | 38.42 | 6 |

Note:
AV: Apparent viscosity of drilling fluid, unit: mPa·s;
PV: Plastic viscosity of drilling fluid, unit: mPa·s;
YP: Yield point of drilling fluid, unit: PA,
Φ3: Reading of a six speed rotational viscometer when a rotating speed is 3 r/min, which is dimensionless;
$FL_{API}$: Medium pressure water loss of drilling fluid (0.7 MPa, room temperature, 30 min), unit: mL; and
ρ: Measured density of drilling fluid, unit: g/cm³.

It can be learned from the test results in Table 2 that, the lubricant provided by the present invention was used in the PLUS-KCl system; the system was aged at 180° C. for 16 h; and the lubrication coefficient reduction rate and the number of anti-wear weights of the obtained system were still at a relatively high level, which were obviously superior to those of the lubricant in Comparative Example 1. This indicates that the lubricant provided by the present invention can significantly improve the anti-wear performance, lubricating performance, and high temperature resistance of the water-based drilling fluid. In addition, after the lubricant provided by the present invention was added to the PLUS-KCl system, the apparent viscosity, plastic viscosity, yield point, and water loss under pressure of the system did not change much. This indicates that the lubricant had no adverse effect on other properties of the PLUS-KCl system.

It can be learned from the above embodiments that, in the present invention, the lubricant prepared by using Turkey red oil, a cyclic anhydride compound, triethanolamine, nano polytetrafluoroethylene powder, an alcohol compound, and water does not contain hazardous substances such as sulfur and phosphorus. This reduces the harm to the environment, equipment, and human body, and conforms to the development trend of modern industrial production. Moreover, the obtained lubricant has excellent extreme pressure performance, and can effectively reduce the downhole friction and torque, thereby meeting the construction requirements of extended reach wells and horizontal wells.

In addition, the preparation method of the lubricant provided by the present invention is simple, easy to control, and convenient for large-scale production.

It can be learned from the test results that when the sulfur- and phosphorus-free extreme pressure lubricant provided by the present invention is used in bentonite slurry, and added according to a dosage of 4.0 g/400 mL, a lubrication coefficient reduction rate of the obtained bentonite slurry can reach above 97%, and the anti-wear performance can reach 10 blocks of weights. When the lubricant is used in a PLUS-KCl system, and added according to a dosage of 4.0 g/400 mL, a lubrication coefficient reduction rate of the system can reach above 75%, and the anti-wear performance can reach 8 blocks of weights. Moreover, the system can resist high temperature of 180° C. and is environmentally friendly.

Although the above embodiments have provided detailed description of the present invention, they are only some rather than all of the embodiments of the present invention. Other embodiments can be obtained based on the embodiments without creative efforts, all of which shall fall within the protection scope of the present invention.

What is claimed is:

1. A sulfur- and phosphorus-free extreme pressure lubricant, comprising the following raw materials: 20-30 parts by weight of Turkey red oil, 20-30 parts by weight of cyclic anhydride compound, 15-20 parts by weight of triethanolamine, 10-20 parts by weight of nano polytetrafluoroethylene powder, 5-10 parts by weight of alcohol compound, and water.

2. The sulfur- and phosphorus-free extreme pressure lubricant according to claim 1, wherein the cyclic anhydride compound comprises one or two of tetrahydrophthalic anhydride, hexahydrophthalic anhydride, and cis-1,2,3,6-tetrahydrophthalic anhydride.

3. The sulfur and phosphorus extreme pressure lubricant according to claim 1, wherein a particle size of the nano polytetrafluoroethylene powder is 50-300 nm.

4. The sulfur- and phosphorus-free extreme pressure lubricant according to claim 1, wherein the alcohol compound comprises ethanol.

5. A preparation method of the sulfur- and phosphorus-free extreme pressure lubricant of claim 1, comprising the following steps:
   mixing the cyclic anhydride compound, triethanolamine, and water, and conducting first-stage reaction; mixing a product of the first-stage reaction with the Turkey red oil, and conducting second-stage reaction; mixing a product of the second-stage reaction with the nano polytetrafluoroethylene powder and alcohol compound, and conducting third-stage reaction obtain the sulfur- and phosphorus-free extreme pressure lubricant.

6. The preparation method according to claim 5, wherein a temperature of the first-stage reaction is 80-90° C., and a time is 3-4 h.

7. The preparation method according to claim 5, wherein a temperature of the second-stage reaction is 160-180° C., and a time is 1-2 h.

8. The preparation method according to claim 5, wherein a temperature of the third-stage reaction is 160-180° C., and a time is 40-60 min.

9. The sulfur and phosphorus extreme pressure lubricant according to claim 1, wherein a dosage ratio of the sulfur- and phosphorus-free extreme pressure lubricant to a drilling fluid is 0.5-3 g/100 mL.

10. The sulfur and phosphorus extreme pressure lubricant according to claim 2, wherein a particle size of the nano polytetrafluoroethylene powder is 50-300 nm.

11. The sulfur- and phosphorus-free extreme pressure lubricant according to claim 2, wherein the alcohol compound comprises ethanol.

12. A preparation method for a sulfur- and phosphorus-free extreme pressure lubricant, the method being applicable to the sulfur- and phosphorus-free extreme pressure lubricant according to claim 1, the method comprising the following steps:
   mixing the cyclic anhydride compound, triethanolamine, and water, and conducting first-stage reaction; mixing a product of the first-stage reaction with the Turkey red oil, and conducting second-stage reaction; mixing a product of the second-stage reaction with the nano polytetrafluoroethylene powder and alcohol compound, and conducting third-stage reaction obtain the sulfur- and phosphorus-free extreme pressure lubricant.

13. A preparation method of a sulfur- and phosphorus-free extreme pressure lubricant, the method being applicable to the sulfur- and phosphorus-free extreme pressure lubricant according to claim 2, the method comprising the following steps:
   mixing the cyclic anhydride compound, triethanolamine, and water, and conducting first-stage reaction; mixing a product of the first-stage reaction with the Turkey red oil, and conducting second-stage reaction; mixing a product of the second-stage reaction with the nano polytetrafluoroethylene powder and alcohol compound, and conducting third-stage reaction obtain the sulfur- and phosphorus-free extreme pressure lubricant.

14. A preparation method of a sulfur- and phosphorus-free extreme pressure lubricant the method being applicable to the sulfur- and phosphorus-free extreme pressure lubricant according to claim 3, the method comprising the following steps
   mixing the cyclic anhydride compound, triethanolamine, and water, and conducting first-stage reaction; mixing a product of the first-stage reaction with the Turkey red oil, and conducting second-stage reaction; mixing a product of the second-stage reaction with the nano polytetrafluoroethylene powder and alcohol compound, and conducting third-stage reaction obtain the sulfur- and phosphorus-free extreme pressure lubricant.

15. A preparation method of a sulfur- and phosphorus-free extreme pressure lubricant, the method being applicable to the sulfur- and phosphorus-free extreme pressure lubricant according to claim 4, the method comprising the following steps:
mixing the cyclic anhydride compound, triethanolamine, and water, and conducting first-stage reaction; mixing a product of the first-stage reaction with the Turkey red oil, and conducting second-stage reaction; mixing a product of the second-stage reaction with the nano polytetrafluoroethylene powder and alcohol compound, and conducting third-stage reaction obtain the sulfur- and phosphorus-free extreme pressure lubricant.

16. A preparation method of a sulfur- and phosphorus-free extreme pressure lubricant, the method being applicable to the sulfur- and phosphorus-free extreme pressure lubricant according to claim 10, the method comprising the following steps:
mixing the cyclic anhydride compound, triethanolamine, and water, and conducting first-stage reaction; mixing a product of the first-stage reaction with the Turkey red oil, and conducting second-stage reaction; mixing a product of the second-stage reaction with the nano polytetrafluoroethylene powder and alcohol compound, and conducting third-stage reaction obtain the sulfur- and phosphorus-free extreme pressure lubricant.

17. A preparation method of a sulfur- and phosphorus-free extreme pressure lubricant, the method being applicable to the sulfur- and phosphorus-free extreme pressure lubricant according to claim 11, the method comprising the following steps:
mixing the cyclic anhydride compound, triethanolamine, and water, and conducting first-stage reaction; mixing a product of the first-stage reaction with the Turkey red oil, and conducting second-stage reaction; mixing a product of the second-stage reaction with the nano polytetrafluoroethylene powder and alcohol compound, and conducting third-stage reaction obtain the sulfur- and phosphorus-free extreme pressure lubricant.

18. The preparation method according to claim 6, wherein a temperature of the second-stage reaction is 160-180° C., and a time is 1-2 h.

19. The preparation method according to claim 5, wherein a dosage ratio of the sulfur- and phosphorus-free extreme pressure lubricant to a drilling fluid is 0.5-3 g/100 mL.

* * * * *